United States Patent [19]

Bott

[11] 4,038,770
[45] Aug. 2, 1977

[54] LICENSE PLATE FRAME ASSEMBLY

[76] Inventor: John A. Bott, 931 Lakeshore Drive, Grosse Pointe Shores, Mich. 48236

[21] Appl. No.: 718,941

[22] Filed: Aug. 30, 1976

Related U.S. Application Data

[63] Continuation-in-part of Ser. No. 683,421, May 5, 1976.

[51] Int. Cl.² .............................................. G09F 7/00
[52] U.S. Cl. ...................................... 40/209; 40/156
[58] Field of Search ............. 40/209, 200, 202, 10 R, 40/129 C, 152, 152.1, 156, 154, 155

[56] References Cited

U.S. PATENT DOCUMENTS

| | | | |
|---|---|---|---|
| 2,082,434 | 6/1937 | White | 40/209 |
| 2,910,793 | 11/1959 | Helmer | 40/209 |
| 2,921,395 | 1/1960 | Fishman | 40/209 |
| 3,423,866 | 1/1969 | Bott | 40/209 |
| 3,611,605 | 10/1971 | Baker | 40/209 |
| 3,835,563 | 9/1974 | Hanstad | 40/209 |

Primary Examiner—John F. Pitrelli
Attorney, Agent, or Firm—Harness, Dickey & Pierce

[57] ABSTRACT

A license plate frame assembly is disclosed as consisting of a one-piece frame member which may be fabricated of a molded plastic material, a die stamped metal or the like; the frame is of a generally rectangular configuration and has a frontal wall that provides a decorative face which may be provided with a hot stamped complementary decorated surface. The frame member also includes rearwardly projecting inner and outer enclosure walls and is adapted to be connected to the associated license plate by having the upper edge of the license plate received within a recess formed along the rearward side of the upper section of the frame member. The recess may be formed by integral rearwardly extending ribs or alternatively by means of a resilient clip secured to the frame. The lower edge of the license plate is also adapted to be secured within a recess located along the bottom section of the frame member, which recess is provided by a removable clip or by integral ribs. In those instances where a clip is used, the clip is retained in place by means of a single fastening element which extends upwardly from the underside of the frame so as to be concealed from view.

1 Claim, 16 Drawing Figures

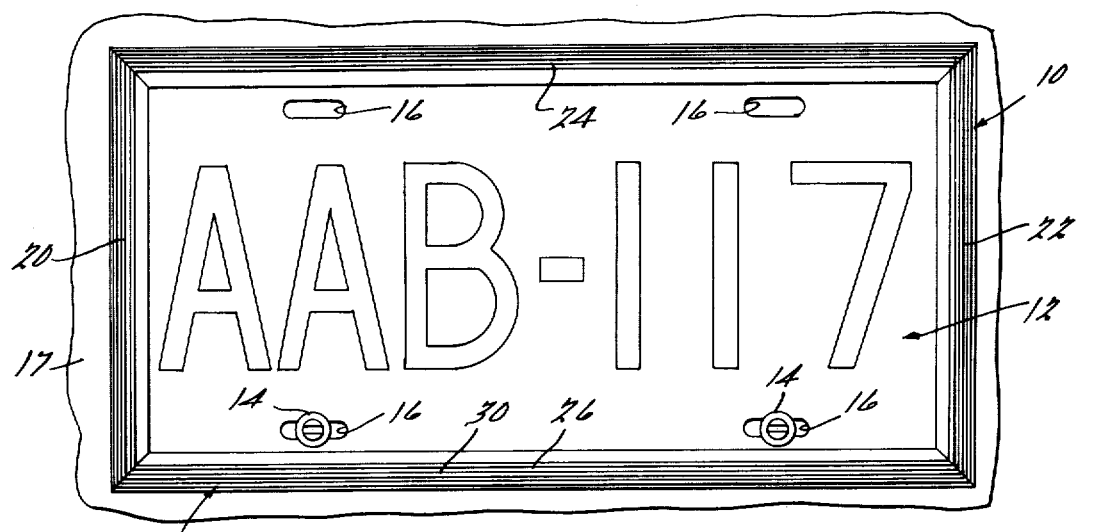
FIG. 1.
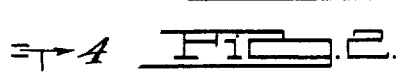
FIG. 2.
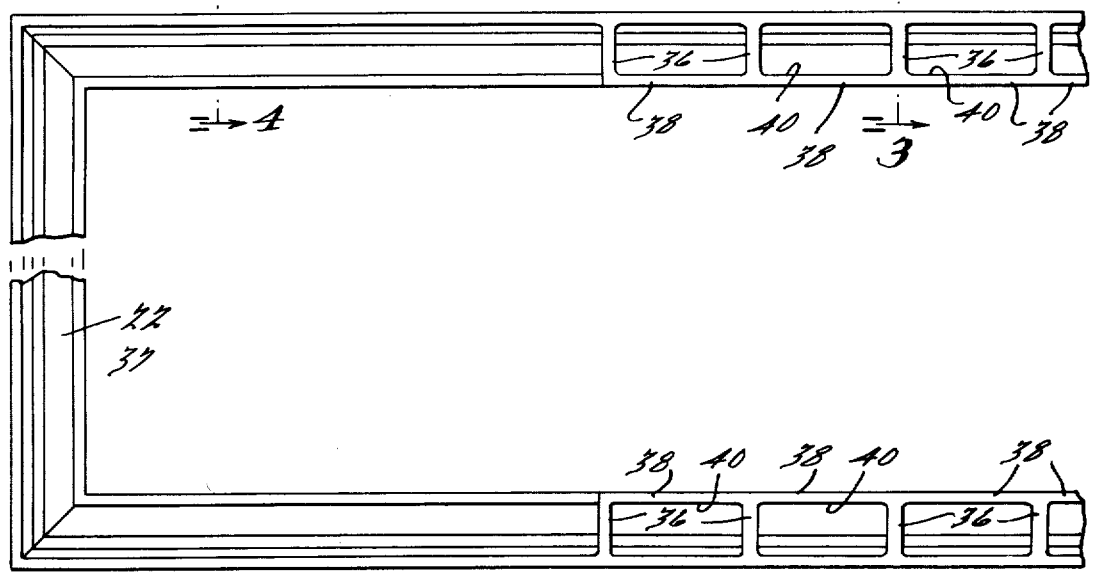
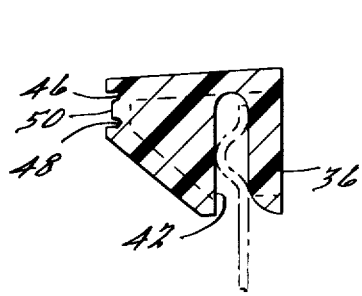
FIG. 3.
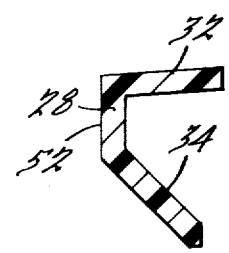
FIG. 10.
FIG. 4.

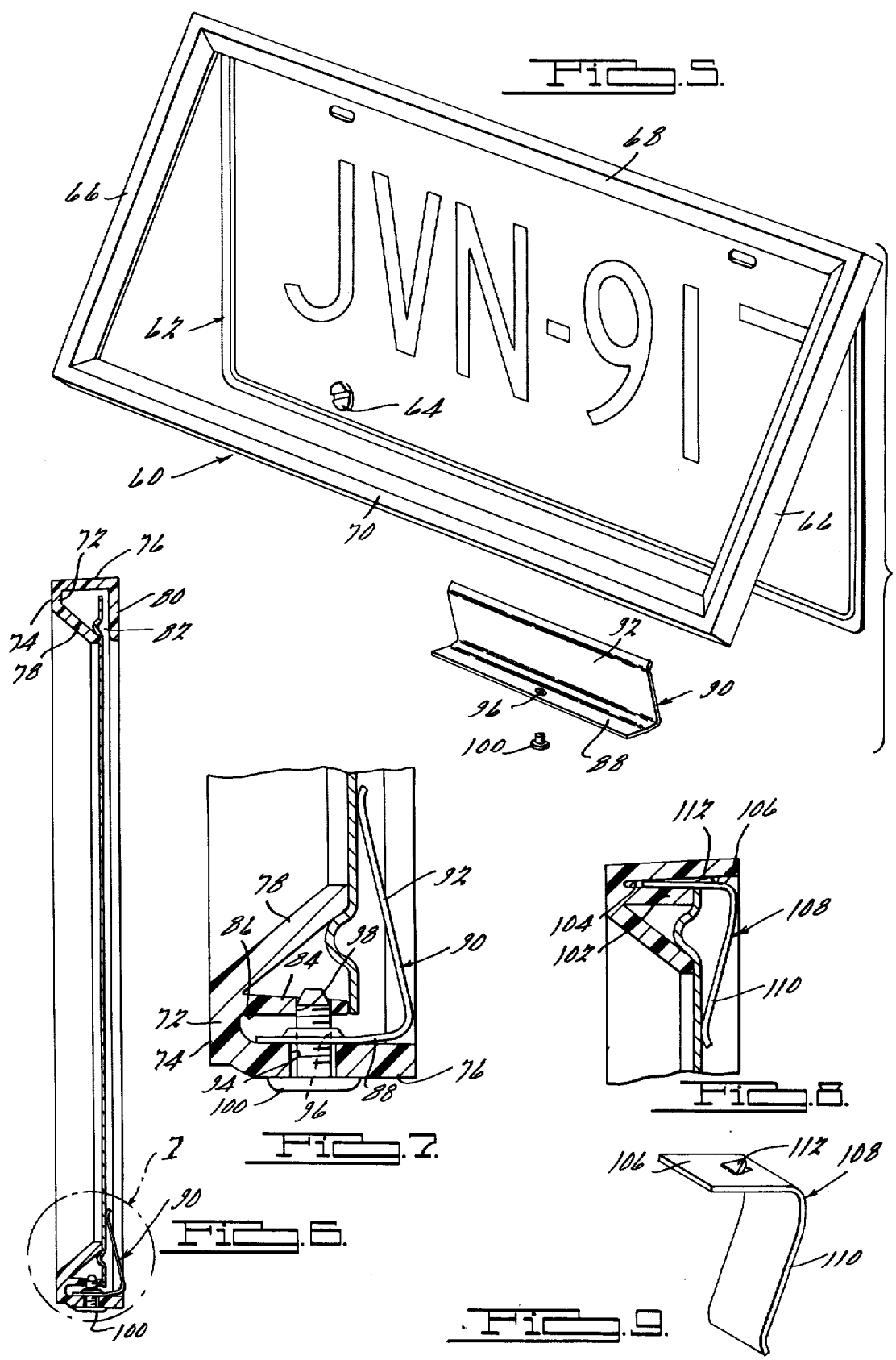

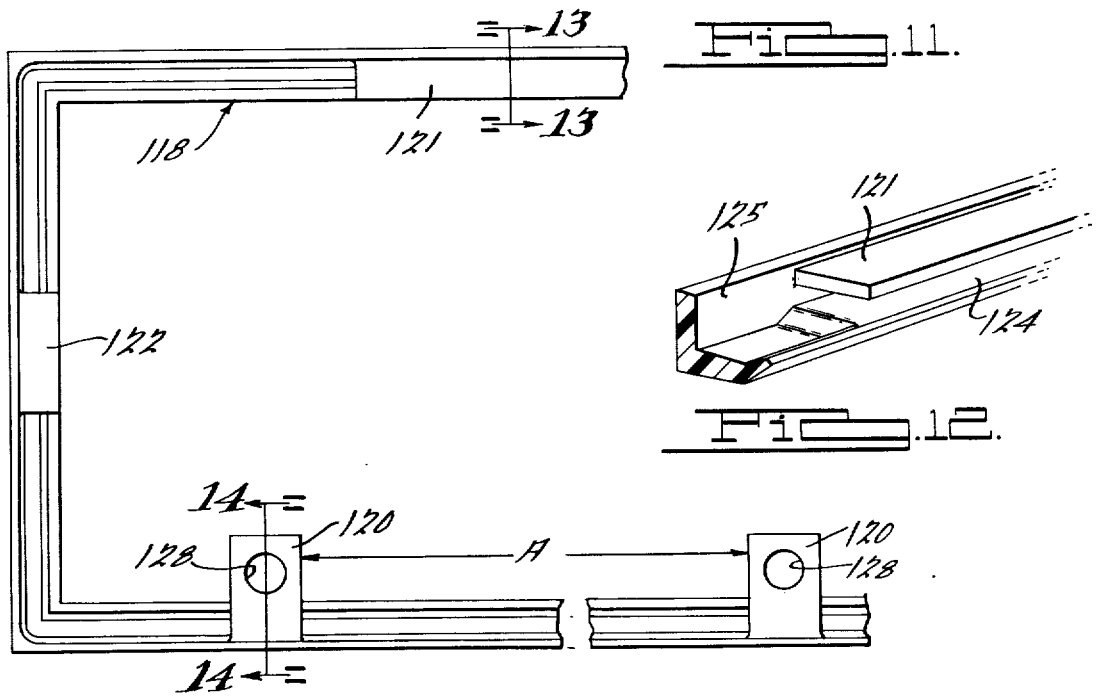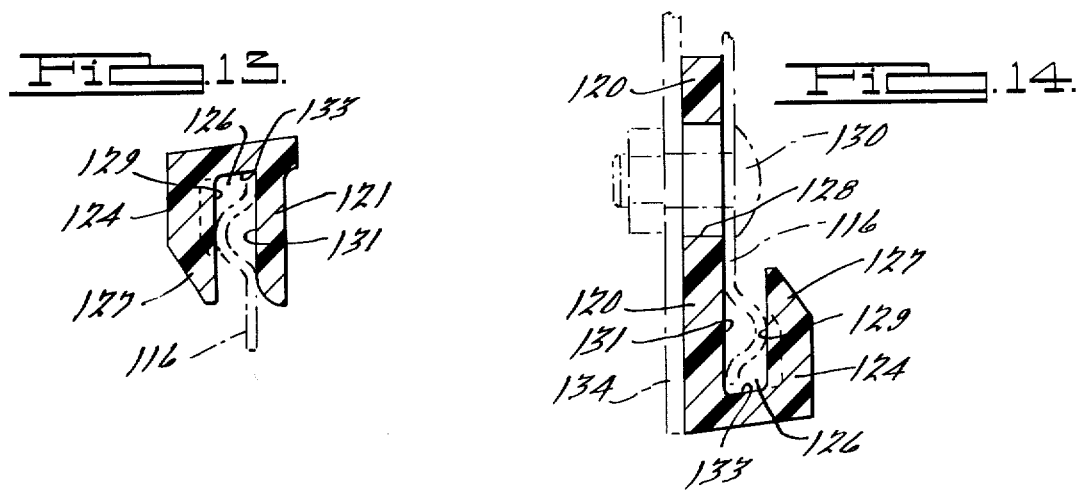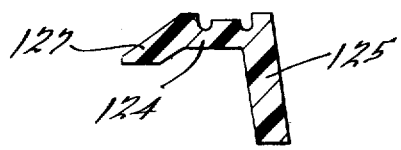

LICENSE PLATE FRAME ASSEMBLY

This application is a continuation-in-part of application Ser. No. 683,421, filed May 5, 1976, entitled "License Plate Frame Assembly".

BACKGROUND AND SUMMARY OF THE INVENTION

This invention relates generally to means for protecting and improving the appearance of vehicle license plates and the like, and more particularly, to a new and improved license plate frame assembly which is adapted to be secured directly to the license plate and serve the two-fold purpose of enhancing the appearance thereof and protecting the plate from damage.

It is accordingly a general object of the present invention to provide a new and improved license plate frame assembly for automotive license plates and the like.

It is a more particular object of the present invention to provide a new and improved license plate frame assembly that is attractive in appearance and which may be positively secured to the associated license plate in a manner so as to assure against inadvertent disassembly.

It is another object of the present invention to provide a new and improved license plate frame assembly which includes attachment means that is operable to permit assembly of the frame member of the license plate even after the license plate has been secured to the associated vehicle.

It is a further object of the present invention to provide a new and improved license plate frame assembly wherein the frame member may be provided with a decorative frontal face in order to enhance or complement the decor of the associated vehicle.

It is yet another object of the present invention to provide a new and improved license plate frame assembly, as above described, which may be fabricated of a one-piece molded polymeric material or may be fabricated of a die-cast metal, or the like.

It is a further object of the present invention to provide a new and improved license plate frame assembly which is of a relatively simple design, is economical to manufacture and will have a long and effective operational life.

It is still a further object of the present invention to provide a new and improved license plate frame assembly, as above described, which may, for certain applications, be fixedly secured to the associated license plate without requiring any ancillary fastening clips or the like, or alternatively, may be operatively associated with such clips for use in installing the frame assembly.

Other objects and advantages of the present invention will become apparent from the following detailed description taken in conjunction with the accompanying drawings.

BRIEF DESCRIPTION OF THE DRAWINGS

FIG. 1 is a front elevational view of one preferred embodiment of the license plate frame assembly of the present invention, as shown in operative association with a typical automotive vehicle license plate;

FIG. 2 is an enlarged fragmentary side elevational view, partially broken away, of the rearward side of the frame member incorporated in the frame assembly shown in FIG. 1;

FIG. 3 is an enlarged transverse cross-sectional view taken substantially along the line 3—3 of FIG. 2;

FIG. 4 is an enlarged transverse cross-sectional view taken substantially along the line 4—4 of FIG. 2;

FIG. 5 is an elevated perspective view of an alternate embodiment of the license plate frame assembly of the present invention;

FIG. 6 is a longitudinal cross-sectional view of the frame assembly shown in FIG. 5;

FIG. 7 is an enlarged fragmentary cross-sectional view of the portion of the frame assembly shown within the circle 7 of FIG. 6;

FIG. 8 is an enlarged fragmentary cross-sectional view, similar to FIG. 7, of a slightly modified embodiment of the present invention;

FIG. 9 is an elevated perspective view of a retaining clip incorporated in the license plate frame assembly shown in FIG. 8;

FIG. 10 is an enlarged transverse cross-sectional view similar to FIGS. 3 and 4 and depicts another alternate embodiment of the present invention;

FIG. 11 is a fragmentary side elevational view of the rearward side of another alternate embodiment of the present invention;

FIG. 12 is an elevated perspective view of the portion of the frame assembly shown in FIG. 11;

FIG. 13 is a transverse cross-sectional view taken substantially along the line 13—13 of FIG. 11;

FIG. 14 is a transverse cross-sectional view taken substantially along the line 14—14 of FIG. 11;

FIG. 15 is a front elevational view of a portion of the embodiment substantially shown in FIG. 11; and FIG. 16 is a transverse cross-sectional view taken substantially along the line 16—16 of FIG. 15.

DESCRIPTION OF THE PREFERRED EMBODIMENTS

Referring now in detail to the drawings and in particular to FIGS. 1—4 thereof, a license plate frame assembly 10, in accordance with one preferred embodiment of the present invention, is shown in operative association with a conventional license plate 12. The plate 12 is secured by means of suitable screws, bolts or the like 14, which project through conventional slots 16, to a suitable vehicle body panel or support member 17 in a manner well known in the art. Suitable elastomeric bumpers or the like (not shown) may be provided between the rearward side of the plate 12 and the body panel 17 for reducing relative vibrational movement of the plate 12.

The assembly 10 comprises a frame structure 18 which extends around the marginal edge of the license plate 12 and encloses its outer periphery. Toward this end, the frame structure 18 comprises laterally spaced side sections 20 and 22, a top section 24 and a lower or bottom section 26, all of which sections 20–26 are of uniform outward appearance and of uniform cross-sectional shape, with the exception of the means for retaining the license plate 12 within the frame structure 18, as will hereinafter be described. As best seen in FIGS. 3 and 4, the sections 20–26 of the frame assembly 10 comprise a frontal wall 28 which defines a forwardly projecting decorative face 30. The frontal wall 28 is integrally connected to a rearwardly projecting outer enclosure wall 32 and a rearwardly projecting inner wall 34. As seen in FIGS. 3 and 4, the inner wall 34 is inclined outwardly and the marginal inner edge thereof is arranged so as to determine directly forwardly of the forward face of the license plate 12. The sections 20–26 are preferably fabricated of a suitable molded polymeric material, such as A.B.S. plastic, a high-impact polystyrene, or the like, whereby the frame structure 18 may be fabricated of a one-piece unitized or molded construction. It will be appreciated, of course, that the frame structure 18 may be fabricated of various other materials and may, for example, consist of a metallic die stamping or the like without departing from the scope of the present invention.

As best seen in FIGS. 2-4, the rearward sides of the top and bottom sections 24, 26 are provided with a plurality of laterally spaced ribs 36 which project between the outer and inner enclosure walls 32 and 34 at the central portions of the sections 24, 26. The plurality of ribs 36 are formed integrally of the frame structure 18 and are connected along their rearwardmost portions by intermediate parts 38. The ribs 36 define rearwardly facing openings 40 (see FIG. 2) and define confronting recesses 42 at the top section 24 and bottom section 26. In particular, the recess 42 defined by the ribs 36 on the top section 24 is open along the lower edge thereof, while the recess 42 defined by the ribs 36 on the bottom section 26 is open along the upper side thereof. The thickness or width of the recesses 42 is approximately equal to the lateral thickness of the upper and lower edges of the license plate 12 (including the peripheral bead or ridge which is normally provided on such license plate 12 in order to enhance the appearance and rigidity thereof), with the result that the upper and lower edge of the license plate 12 are adapted to be nestingly received within the recesses 42 for fixedly retaining the license plate frame assembly 10 thereto.

In order to effect assembly of the frame structure 18 onto the license plate 12, the plate 12 and structure 18 are aligned with one another in end-to-end relationship and are then moved longitudinally of one another such that one end of the license plate 12 moves into the recesses 42 along the frame sections 24 and 26. Such relative longitudinal movement of the frame structure 18 and license plate 12 is continued until the license plate 12 moves into registry with the frame structure 18, i.e., is centered between the side sections 20, 22, at which time the upper and lower edges of the plate 12 are confined within the recesses 42. The plate 12 may be thereafter secured via the aforementioned screws, bolts or the like 14 to the associated body panel 17, whereby to fixedly attach the assembly 10 and plate 12 in their respective operative positions upon the associated vehicle.

In accordance with the present invention, it is to be noted that the frame structure 18, and in particular, the decorative face 30 thereof, is formed with a pair of spaced parallel recesses 46, 48 which define a relieved central area 50 therebetween. The area 50 may be provided with any suitable matching or contrasting decorative material, for example, may be formed by a suitable hot stamping operation with a leather-like or woodgrain texture, whereby to enhance the aesthetic appearance of the license plate frame assembly 10 of the present invention. Alternatively, the frontal wall 28 may be provided with a relatively planar or flat surface, such as is indicated at 52 in the slightly modified embodiment of the frame structure 18 shown in FIG. 10. Of course, various alternative designs may be utilized without departing from the scope or fair meaning of the present invention.

Referring now to another embodiment of the present invention, and in particular to FIGS. 5-7, a license plate frame assembly 60 is shown in operative association with a vehicle license plate 62 which is adapted to be secured to a suitable automotive vehicle body panel by screws, bolts or the like 64. The license plate frame assembly 60 comprises a frame structure having spaced parallel side sections 66, a top section 68 and a bottom section 70, all of which are integrally connected, as was the case with the aforedescribed frame structure 18. The sections 66-70 are provided with a common frontal wall 72 defining a front or downward decorative face 74. The sections 66-70 also comprise a rearwardly extending outer enclosure wall 76 which is arranged at generally right angles to the frontal wall 72, and with a rearwardly and inwardly inclined inner enclosure wall 78.

As best seen in FIG. 6, the upper section 68 of the frame assembly is formed with a downwardly extending flange 80 which is arranged generally parallel to the frontal wall 72 and defines a recess 82 with the rearwardmost edge of the inner enclosure wall 78 that is adapted to nestingly receive the upper edge of the license plate 62. The bottom section 70 of the frame assembly 60 is formed with another flange, generally designated 84, which extends rearwardly of the frontal wall 72 and is arranged generally parallel to the outer enclosure wall 76 of the bottom section 70, as best seen in FIGS. 6 and 7. The flange 84 defines a recess 86 with the adjacent outer wall 76 which is adapted to nestingly receive one leg section 88 of a generally L-shaped retaining clip 90 in the manner best seen in FIG. 7. The clip 90 includes another upwardly and forwardly inclined leg 92 which is adapted to bear against the rearward side of the associated license plate 62 upon assembly of the frame 60 thereto in a manner hereinafter to be described. The outer enclosure wall portion 76 of the frame assembly 60 is formed with a bore or opening 94 which is aligned with another bore 96 formed in the leg section 88 of the clip 90. The bores 94, 96 are aligned with another bore 98 which is formed in the flange section 84, whereby a suitable screw, bolt or the like 100 may be threadably received within the aligned bores 94-98 for fixedly retaining the clip 90 and hence the license plate 92 within the frame assembly 60. The screw 100 may be of the self-tapping type or instead, one or more of the bores 94-98 may be internally threaded and adapted for threaded reception of the screw 100.

In order to effect installation of the frame assembly 60, the upper edge of the license plate 62 is intially inserted into the recess 82 and thereafter the frame assembly 60 may be pivoted from the position shown in FIG. 5 to the position shown in FIG. 6 whereupon the license plate 62 and frame assembly 60 are oriented generally coplanar of one another. Thereafter, the leg 80 of the clip 92 may be inserted into the recess 86 to a position wherein the bore 96 thereof is aligned with the bores 94 and 98 and the leg 92 resiliently engages the rearward side of the plate 62 and biases the same into engagement with the rearwardmost portion of the inner enclosure wall 78. Thereafter, the screw 100 may be threadedly received within the bores 94-98 to retain the frame assembly 60 to the plate 62. One particular advantage of the aforedescribed type of assembly resides in fact that the frame assembly 60 may be conveniently installed on the license plate 62 after the plate 62 is mounted upon the associated vehicle and without necessitating removal of the plate 62. Additionally, because the screw 100 is located at the underside of the assembly 60, the outward apppearance of the assembly 60 is in no way affected thereby.

FIGS. 8 and 9 illustrate a slightly modified embodiment wherein the top section 86 of the frame assembly 60, instead of being formed with the aforedescribed downwardly extending flange 80, is formed with a rearwardly extending flange 102 which is arranged generally parallel to the outer enclosure wall 76 and defines a recess 104 therewith. The recess 104 is adapted to nestingly receive one leg section 106 of a generally L-shaped retaining clip 108, the other leg 110 of which is adapted to bear against the rearward side of the associated license plate in much the same manner as the aforedescribed clip 90. The clip 108 is adapted to be secured within the recess 104 by means of a suitable stamped ear or tang portion 112 having a relatively sharp inclined point thereon such that once the leg section 106 thereof is installed or inserted into the recess 104, the clip 108 will be fixedly secured to the associated frame assembly. The leg section 110 of the clip 108 is adapted to function in essentially the same manner as the aforementioned flange 80 and may be installed onto the frame assembly prior to installation of the frame assembly onto the associated license plate. In other words, once the clip 108 is installed in the recess 104, the upper edge of the associated license plate may be inserted into the recess defined between the downwardly extending leg 110 and the inner enclosure wall 78, as seen in FIG. 8. Thereafter, the lower edge of the license plate may be secured to the associated frame assembly, such as by the aforementioned retaining clip 90. It is to be noted that with the arrangement shown in FIGS. 5-9, there is no fastening means exposed (other than the screw 100) whereby to detract from the appearance of the frame assembly. Additionally, the frontal wall 72 may be provided with any suitable decoration or may be colored in any contrasting complementary manner with regard to the remaining portions of the frame assembly 60, as will be appreciated by those skilled in the art.

FIGS. 11 through 16 illustrate yet another modified embodiment comprising a one-piece, rectangular frame member 118 having a plurality of integral, inwardly extending tabs 120, 121 and 122, running generally perpendicular to outer enclosure wall 125. As exhibited in FIGS. 12, 13 and 14, tabs 120, 121 and 122 cooperate with frontal wall 124 so as to define a plurality of license plate edge receiving slots 126, which slots 126 provide positive means for receiving the periphery of the plate so as to positively retain the frame 118 thereon, as shown in FIGS. 13 and 14. Thus the tabs 120, 121 and 122 are functionally similar to flange 80 shown in FIG. 6, in preventing the frame 118 from separating from license plate 116 in a direction normal to the plane defined by license plate 116. Additionally, tabs 122 tend to restrict the transverse movement of frame 118 with respect to license plate 116.

Tabs 120 are spaced apart a distance labeled A in FIG. 11, which distance corresponds to the spacing of the lower license plate mounting openings and are provided with locating bores 128, which bores adapt tabs 120 to accept the passage of the license plate mounting fasteners 130, as shown in FIG. 14. Thus, tabs 120 assure the positive attachment of frame 118 to the body of the vehicle, a portion of which is shown as 134 in FIG. 14, thereby reducing the potential for both unacceptable vibration and inadvertent detachment of frame 118. Also, since the insertion of fasteners 130 through both the locating bores 128 and the license plate mounting holes will effectively immobilize license plate 116 with respect to frame 118, the retention of license plate 116 within frame 118 is enhanced. This feature may be especially desirable for off-road or other heavy-duty operation. Additionally, the tabs 120 simplify the centering of license plate 116 in frame 118, as proper alignment between the plate and frame is achieved when locating bores 128 register with the mounting holes provided in license plate 116. Although tabs 120 are illustrated in FIGS. 11 and 15 as being associated with the lower side of frame 118, said tabs may be located on the upper side of frame 118 if the particular application so requires. The orientation of tabs 120 with respect to the remainder of frame 118 is shown more particularly by FIG. 15, which depicts the exposed portions of the frame. Tabs 120, 121 and 122 may have a simple planar, rectangular shape as illustrated in FIGS. 11 through 16, or alternatively, a more complex configuration, as will be appreciated by those skilled in the art.

A comparison of FIGS. 13, 14 and 16 will reveal that the cross-sectional dispositions of frontal wall 124 and inner enclosure wall 127 are altered in those areas which correspond to tabs 120, 121 and 122 such that the spaces between frontal wall 124, inner enclosure wall 127, outer enclosure wall 125 and tabs 120, 121 and 122 are defined by two substantially parallel faces 129 and 131 and opposing face 133, as shown in FIGS. 13 and 14. These altered cross-sections provide additional strength and more positive license plate retention, as the bead or semi-cylindrical raised surface formed around the periphery of the license plate may bear on flat surfaces 129, as shown in FIGS. 13 and 14.

Insertion of license plate 116 into frame 118 may be accomplished by manually displacing tab 121, or either of tabs 122 or both of tabs 120, such that license plate 116 may be slidingly engaged with frame 118, at which time the previously displaced tab(s) may be restored to their original position. A preferred manner of assembly would be to manually displace tab 121 as described such that license plate 116 can be slidingly engaged with tabs 120 and tabs 122.

If frame 118 and its associated tabs are constructed of a material which will not readily tolerate repeated plastic deformation without failure due to attendant work hardening, such as die cast zinc, the deletion of tabs 122 on the vertial sides of frame 118 will permit the installation of license plate 116 within frame 118 without the necessity of any displacement of the remaining tabs. In some applications, the additional license plate retention force afforded by tabs 122 may not be required, and if so, said tabs may be omitted, whether or not the work-hardening characteristics of the frame's material would otherwise indicate such omission.

Although tabs 120, 121 and 122 need not provide elastic deformation induced clamping force on license plate 116 in order to properly retain the license plate, this feature may be included.

The present embodiment is adapted to accept any of the previously mentioned cosmetic treatments which may be applied to frontal wall 124, including but not limited to hot stamping with colors, a woodgrain effect, etc.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A one-piece molded plastic license plate frame adapted for cooperation with a license plate having a width dimension of approximately twice its height dimension and having a pair of spaced apart fastener receiving openings formed adjacent one horizontally extending edge thereof, said frame being of a generally rectangular shape and comprising upper and lower horizontally extending sections and vertically disposed end sections extending between and integrally connected to the opposite ends of said horizontal sections, each of said frame sections comprising an outer enclosure wall portion arranged at substantially right angles to the plane of said license plate, and an integral frontal wall portion that extends substantially parallel to the plane of the license plate and inwardly from the forwardmost part of the associated outer enclosure wall portion, said frontal wall portions providing an unobstructed rectangular opening having linear side edges through which the forward face of the license plate may be viewed, said frontal wall portions overlying the outer marginal edge portions of the forward face of said license plate and defining inwardly and rearwardly beveled face portions adjacent said opening and a decorative face area, said decorative face areas including a pair of spaced parallel forwardly projecting ribs between which is located an intermediate recessed surface area provided with an appearance enhancing treatment, said ribs protecting said intermediate area from the deleterious effects of car washing brushes, flying objects, such as stones, and the like, a plurality of plate retaining flange elements formed integrally of selective of said sections and including a first flange element on the uppermost of said horizontally extending sections and a second flange element on the lowermost of said horizontally extending sections, and third and fourth flange elements on said vertically disposed flange sections, said flange elements defining plate edge receiving recesses with said outer and frontal wall portion of the associated frame sections and being located on the rearward side of said license plate and thus being totally concealed from the forward side of said frame by said plate when the same is assembled into said frame, one of said flange elements associated with one of said horizontally extending sections being formed with an opening adapted to be aligned with one of said openings formed in said plate upon assembly of said plate within said frame whereby fastening means may be inserted through the aligned openings to secure said plate and frame in a unitized assembly, said frame being fabricated of a rigid yet deflectable material, such as ABS plastic, whereby assembly of said license plate into said frame may be achieved by inserting the side edges of said plate into the recesses defined by said third and fourth flange elements and moving said plate relative to said frame to a position wherein the leading horizontal edge of said plate is inserted into the slot of the adjacent horizontally extending frame section, and thereafter biasing the horizontal section of said frame associated with the opposite horizontal edge of the plate outwardly to permit said opposite horizontal edge of said plate to be inserted behind the associated flange element, and when said force on said biased horizontal frame section is relieved, said section will move under the influence of the natural elasticity of the plastic material toward its normal position retaining said opposite horizontal plate edge within the associated of said slots.

* * * * *